(12) United States Patent
TeGrotenhuis (10) Patent No.: US 8,572,862 B2
(45) Date of Patent: Nov. 5, 2013

(54) OPEN-LOOP HEAT-RECOVERY DRYER

(75) Inventor: Ward Evan TeGrotenhuis, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 454 days.

(21) Appl. No.: 12/911,631

(22) Filed: Oct. 25, 2010

(65) Prior Publication Data

US 2012/0096732 A1    Apr. 26, 2012

(51) Int. Cl.
F26B 21/06    (2006.01)

(52) U.S. Cl.
USPC ..... 34/82; 34/86; 34/218; 165/164; 62/324.2; 96/6; 95/46; 208/211

(58) Field of Classification Search
USPC ........ 34/82, 86, 218; 165/164, 166; 62/324.2, 62/497; 96/6; 95/46; 429/17, 19; 208/211, 208/212, 214
See application file for complete search history.

(56) References Cited

U.S. PATENT DOCUMENTS

| | | | | |
|---|---|---|---|---|
| 3,218,728 | A * | 11/1965 | Barth John R et al. | 34/292 |
| 4,196,526 | A * | 4/1980 | Berti | 34/77 |
| 4,603,489 | A | 8/1986 | Goldberg | |
| 4,780,967 | A * | 11/1988 | Mucic | 34/86 |
| 5,537,758 | A * | 7/1996 | Guarise | 34/216 |
| 6,094,835 | A * | 8/2000 | Cromer | 34/80 |
| 6,742,284 | B2 * | 6/2004 | Dinh | 34/514 |
| 6,869,462 | B2 * | 3/2005 | TeGrotenhuis et al. | 95/51 |
| 7,020,985 | B2 | 4/2006 | Casey et al. | |
| 7,055,262 | B2 | 6/2006 | Goldberg et al. | |
| 7,125,540 | B1 * | 10/2006 | Wegeng et al. | 423/650 |
| 7,213,349 | B1 | 5/2007 | Brunner et al. | |
| 8,240,064 | B2 * | 8/2012 | Steffens | 34/480 |
| 8,266,813 | B2 * | 9/2012 | Grunert et al. | 34/85 |
| 8,356,423 | B2 * | 1/2013 | Corberan Salvador et al. | 34/108 |
| 2005/0066538 | A1 * | 3/2005 | Goldberg et al. | 34/218 |
| 2005/0247552 | A1 * | 11/2005 | TeGrotenhuis et al. | 201/41 |
| 2006/0179676 | A1 | 8/2006 | Goldberg et al. | |
| 2006/0266507 | A1 | 11/2006 | Eom et al. | |
| 2012/0096732 | A1 * | 4/2012 | Tegrotenhuis | 34/82 |

FOREIGN PATENT DOCUMENTS

| | | | | |
|---|---|---|---|---|
| GB | 2411944 A | * | 9/2005 | F26B 21/04 |
| JP | 55079834 A | * | 6/1980 | C22B 1/00 |
| JP | 58051974 A | * | 3/1983 | C02F 1/12 |
| JP | 09152268 A | * | 6/1997 | F26B 5/06 |
| KR | 10-0676910 | | 1/2007 | |
| KR | 10-0685965 | | 2/2007 | |
| WO | WO 9801583 A1 | * | 1/1998 | C14B 1/58 |

OTHER PUBLICATIONS

International Search Report for related International Application No. PCT/US2011/055986, 6 pages, mailed May 23, 2012.

* cited by examiner

Primary Examiner — Steve M Gravini
(74) Attorney, Agent, or Firm — Klarquist Sparkman, LLP (57) ABSTRACT

A drying apparatus is disclosed that includes a drum and an open-loop airflow pathway originating at an ambient air inlet, passing through the drum, and terminating at an exhaust outlet. A passive heat exchanger is included for passively transferring heat from air flowing from the drum toward the exhaust outlet to air flowing from the ambient air inlet toward the drum. A heat pump is also included for actively transferring heat from air flowing from the passive heat exchanger toward the exhaust outlet to air flowing from the passive heat exchanger toward the drum. A heating element is also included for further heating air flowing from the heat pump toward the drum.

15 Claims, 4 Drawing Sheets

OPEN-LOOP HEAT-RECOVERY DRYER

ACKNOWLEDGMENT OF GOVERNMENT SUPPORT

This invention was made with government support under Contract DE-AC0576RLO1830, awarded by the U.S. Department of Energy. The government has certain rights in the invention.

FIELD

This disclosure relates to dryers for drying wet articles, such as clothes, and particularly to dryers having an open-loop heat-recovery drying system.

BACKGROUND

A conventional clothes dryer draws in ambient air, passes the ambient air by a heater, passes the heated air through a rotating drum containing wet laundry where the heated air extracts moisture from the wet laundry, and expels the warm and moist air out of the building. This process is inefficient because much of heat energy produced by the heater is wasted in the expelled air.

SUMMARY

Disclosed herein are embodiments of an open-loop heat-recovery drying system that can be used, for example, in clothes dryers that are more energy-efficient than conventional clothes dryers.

In some embodiments, a drying apparatus includes a drum and an open-loop airflow pathway originating at an ambient air inlet, passing through the drum, and terminating at an exhaust outlet. A passive heat exchanger is included for passively transferring heat from air flowing from the drum toward the exhaust outlet to air flowing from the ambient air inlet toward the drum. A heat pump is also included for actively transferring heat from air flowing from the passive heat exchanger toward the exhaust outlet to air flowing from the passive heat exchanger toward the drum. A heating element is also included for further heating air flowing from the heat pump toward the drum. Due to the inclusion of the passive heat exchanger, the combined power consumption of the heat pump and the heating element can be less than ½ of a power consumption of a conventional residential clothes dryer heating element.

In some embodiments, a drying apparatus includes a drying chamber for containing articles to be dried, a first airflow from an ambient source to the drying chamber and a second airflow from the drying chamber to an exhaust. The first airflow is heated in at least three stages, including a first stage comprising a passive heat exchanger, a second stage comprising an active heat exchanger and a third stage comprising a heating element. The second airflow is cooled by the passive heat exchanger and the active heat exchanger. The first airflow is heated at the first stage to a first temperature, heated at the second stage to a second temperature that is higher than the first temperature, and heated at the third stage to a third temperature that is higher than the second temperature.

Also disclosed are embodiments of a passive heat exchanger for a drying apparatus. In some of the embodiments, the passive heat exchanger includes a plurality of stacked layers each having a plurality of substantially rectangular airflow channels extending therethrough and having an airflow direction that is transverse to airflow directions of immediately adjacent layers. At least one of the plurality of airflow channels has a width less than or equal to about 1.0 mm and a height less than or equal to about 3.2 mm, the width and height being transverse to the airflow direction of the airflow channel.

The foregoing will become more apparent from the following detailed description, which proceeds with reference to the accompanying figures.

DETAILED DESCRIPTION

Figure 1:
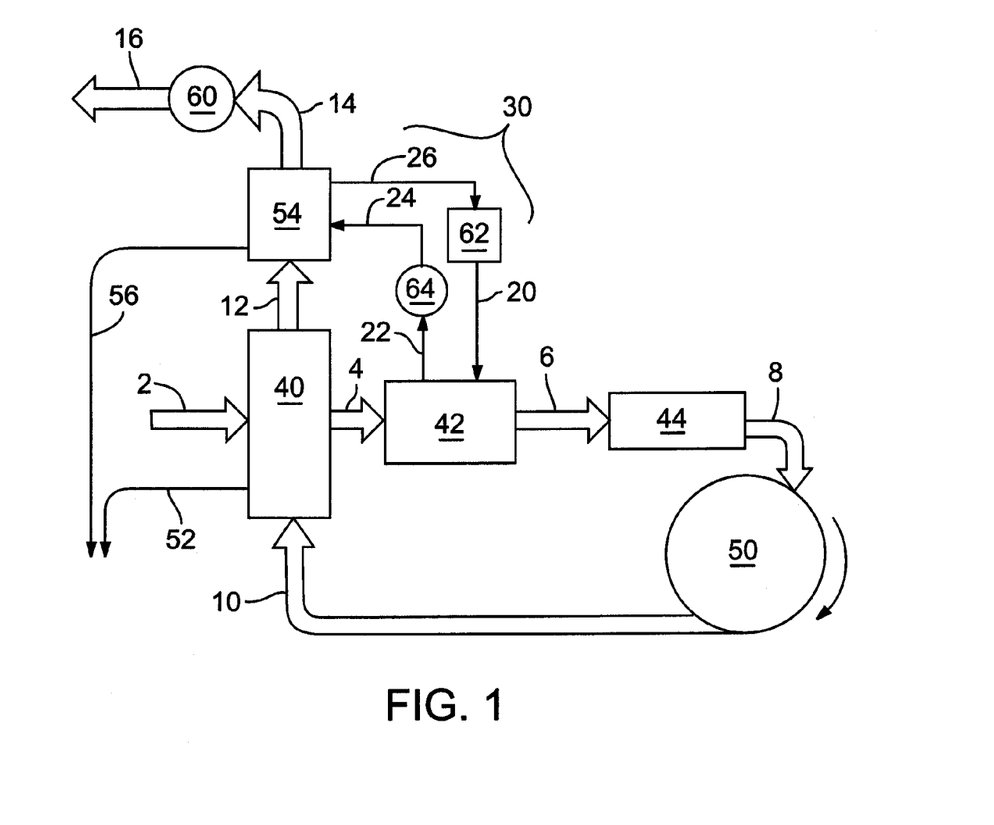
FIG. 1 is diagram of an exemplary open-loop, heat-recovery drying system, which includes a passive heat exchanger, a heat pump and a heating element.

An exemplary embodiment of an open-loop heat-recovery drying system is shown in FIG. 1. The system uses heated air to extract moisture from wet articles, such as clothes or other fabric material. An open-loop heat-recovery drying system can be used in any suitable drying apparatus, such as in residential or industrial clothes dryers.

An open-loop heat-recovery clothes dryer can be similar to a conventional clothes dryer in that conventional clothes dryers also use an open-loop drying system wherein heated dry air enters the drum, extracts moisture from the clothes, and then leaves the drum, warm and wet. A fundamental difference, however, is in the way an open-loop heat-recovery drying system recycles heat by transferring some of the heat from the post-drum airflow to the pre-drum airflow rather than allowing all of the post-drum heat to be lost in the exhaust air as it is vented out of the building. Due to the open-loop structure, the drying system can also take advantage of the superior water-carrying capacity of the incoming ambient air, as opposed to the low-grade, saturated exhaust air.

An exemplary embodiment of an open-loop heat-recovery drying system is shown in FIG. 1. In this system, air travels through the drying system in an airflow pathway from an inlet at point 2 toward an outlet at point 16. The airflow pathway can comprise a first airflow pathway from point 2 to point 8, wherein incoming ambient air is heated in multiple stages prior to entering the drum 50, and a second airflow pathway from point 10 to point 16, wherein warm moisture-laden air exiting the drum is cooled in multiple stages prior to being exhausted.

The first airflow pathway can comprise at least three heating stages. For example, a first heating stage can comprise a passive heat exchanger, or heat recuperator, (such as the heat exchanger 40), a second heating stage can comprise an active heat exchanger (such as a heat pump 30 comprising a condenser 42 and an evaporator 54), and a third heating stage can comprise a conventional heating element (such as heating element 44). Air flowing through the second airflow pathway from point 10 toward point 16 can be cooled by the passive heat exchanger and the active heat exchanger that comprise the first and second heating stages, respectively. As a result of the three-stage heating process shown in FIG. 1, the air at point 8 is warmer than the air at point 6, the air at point 6 is warmer than the air at point 4, and the air at point 4 is warmer than the air at point 2.

Incoming air can be heated in such a multi-stage heating process throughout an entire drying cycle. In other words, all three or more heating stages can remain actively adding heat to the incoming air from when the drying process begins until the drying process ends, rather than only at the start-up portion of the cycle or at some other portion of the drying cycle.

An air-moving device or blower 60 can cause air to flow continuously through the entire airflow pathway from an ambient air inlet at point 2 toward an exhaust outlet at point 16. The blower 60 can also be positioned at other points in the airflow pathway than what is shown in FIG. 1, with similar effect. Multiple air-moving devices can also be used.

In operation, ambient air enters the system at point 2, such as from outdoors or from within a room in which a dryer is located. This ambient air is typically low in moisture content. From point 2, air flows through the passive heat exchanger 40 to point 4. The passive heat exchanger transfers heat via thermal convection and conduction from relatively warmer post-drum air, flowing from point 10 to point 12, to the relatively cooler incoming air, flowing from point 2 to point 4. Thus, the air at point 4 is warmer than the ambient air entering the system at point 2.

From point 4, air flows through the condenser 42 to point 6. The condenser 42, a component of the heat pump 30, heats air flowing through the condenser such that the air at point 6 is warmer than the air at point 4.

From point 6, air flows through a heating element 44 to point 8. The heating element 44 adds additional heat to the air such that the air at point 8 is warmer than the air at point 6. The heating element can, for example, be of a conventional type that converts electrical energy to heat energy. The heating element 44 can be the last heating stage in the airflow pathway such that the maximum temperature of the airflow, the temperature of the air entering the drum, can be regulated via the heating element. The heating element 44 can remain powered throughout the drying cycle, such that it continually heats air entering the drum 50 from the beginning to the end of a drying job. Due to energy saved by the passive heat exchanger 40 and the heat pump 30, for a given drying job, the size and/or power of heating element 44 can be reduced such that it consumes about 40% the power of heating elements in conventional clothes dryers.

From point 8, heated dry air enters the drum 50, extracts moisture from articles within the drum, and exits the drum to point 10 cooler and wetter. The drum can be of any known type, such as those found in conventional clothes dryers.

From point 10, warm air laden with moisture flows through the passive heat exchanger 40 to point 12. The passive heat exchanger transfers heat via thermal conduction from the warm wet air flowing from point 10 toward point 12 to the relatively cooler incoming air flowing from point 2 toward point 4. As the warm wet air flowing from point 10 toward point 12 is cooled, some of the moisture carried in the air can condense within the passive heat exchanger 40. This condensate can be conducted out of the passive heat exchanger 40 via a conduit 52 to a collection tank and/or to a drain.

From point 12, air flows through the evaporator 54 to point 14. The evaporator 54, a component of the heat pump 30, cools air flowing through it such that the air at point 14 is cooler than the air at point 12. Heat extracted by the evaporator 54 is actively transferred via the heat pump 30 to the condenser 42, where the heat is added, along with energy added by the compressor 62, to air flowing through the condenser. As air is cooled within the evaporator 54, some of the remaining moisture carried in the air can condense. This condensate liquid can be conducted out of the evaporator 54 via a conduit 56 to a collection tank and/or to a drain. The air exiting the evaporator 54 at point 14 can be cool and saturated, which can make it less desirable for drying purposes than the incoming ambient air at point 2.

From point 14, cooled wet air flows through the blower 60 and exits the system as exhaust air at point 16. The exhaust air can optionally be expelled into an indoor environment to help condition that environment. Otherwise, the exhaust air can be expelled outdoors.

Passive Heat Exchanger

In contrast to the heat pump 30, the heat exchanger 40 does not consume power and transfers heat passively via thermal convection and conduction. Within the heat exchanger 40, two or more airflows of different temperatures flow near one another, separated by thin metal walls, without fluidly communicating with one another. Due to the small size of the flow channels and the high thermal conductivity of the thin walls, heat is naturally and efficiently transferred from the relatively warmer airflow(s) to the relatively cooler airflow(s).

Figure 2:
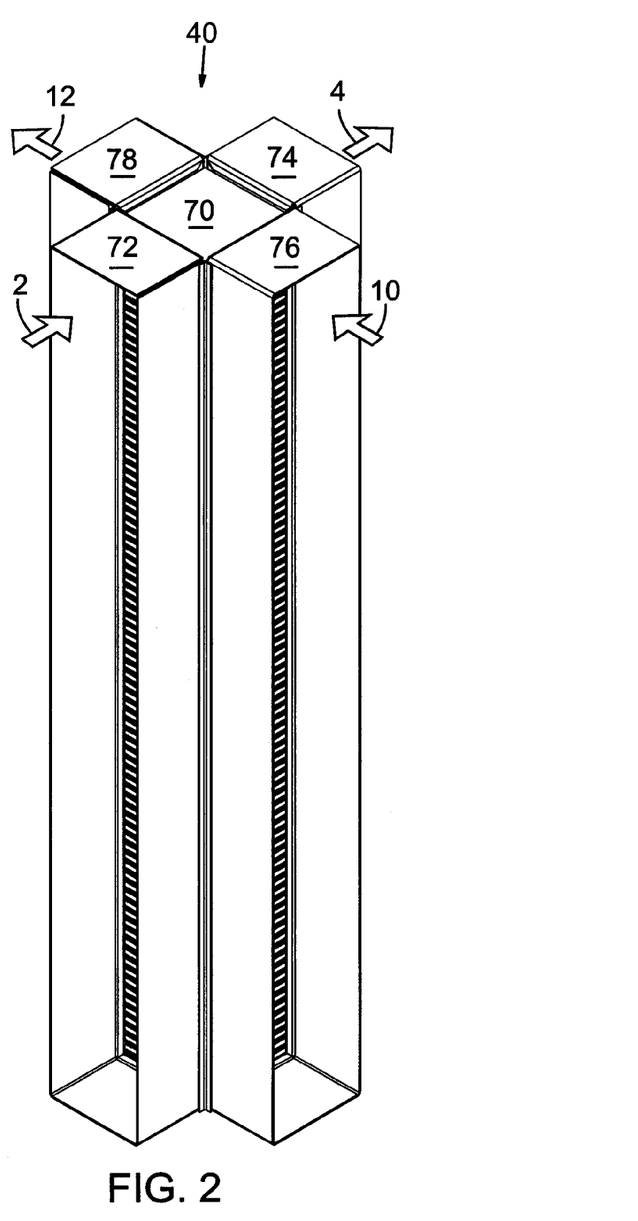
FIG. 2 is an isometric view of one embodiment of the passive heat exchanger of FIG. 1.
Figure 3:
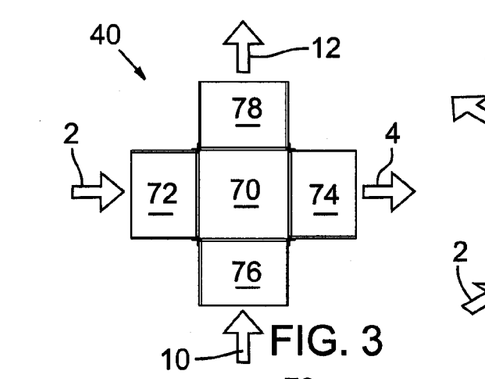
FIG. 3 is a top view of the passive heat exchanger of FIG. 2.
Figure 4:
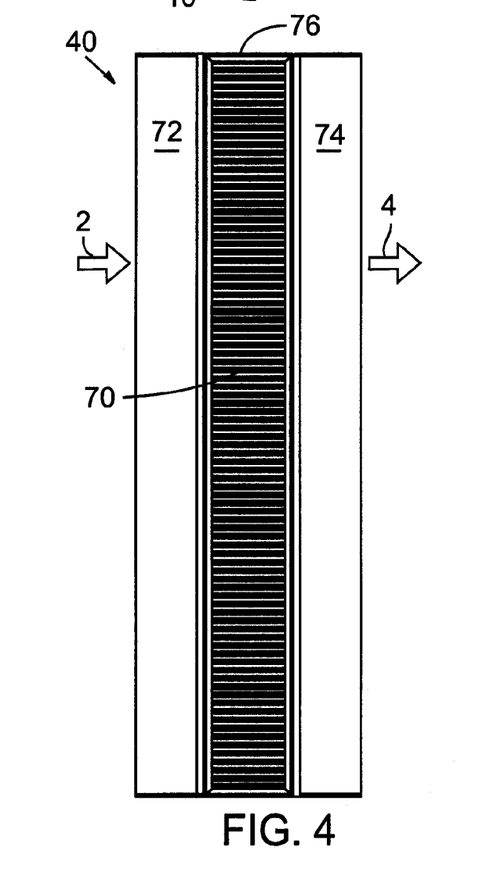
FIG. 4 is a side view of the passive heat exchanger of FIG. 2.

Any type of heat exchanger may be used in the drying system, however an embodiment of a cross-flow, air-to-air heat exchanger 40 is shown in FIGS. 2-4. Warmer air flowing through the heat exchanger 40 from the drum 50 flows in a first direction, shown by arrows 10 and 12, and cooler incoming air flowing through the heat exchanger toward the drum flows in a second direction, shown by arrows 2 and 4. The second flow direction can be transverse to the first direction, as shown in FIG. 3. In other embodiments, the flow paths of the two airflows can be in opposite directions, in the same direction, or in other orientations relative to one another.

The heat exchanger 40 can comprise a central portion, or core, 70, where the heat transfer occurs, and four ducts 72, 74, 76 and 78 for conducting airflows 2, 4, 10 and 12, respectively, into or out of the core.

Figures 5, 6:
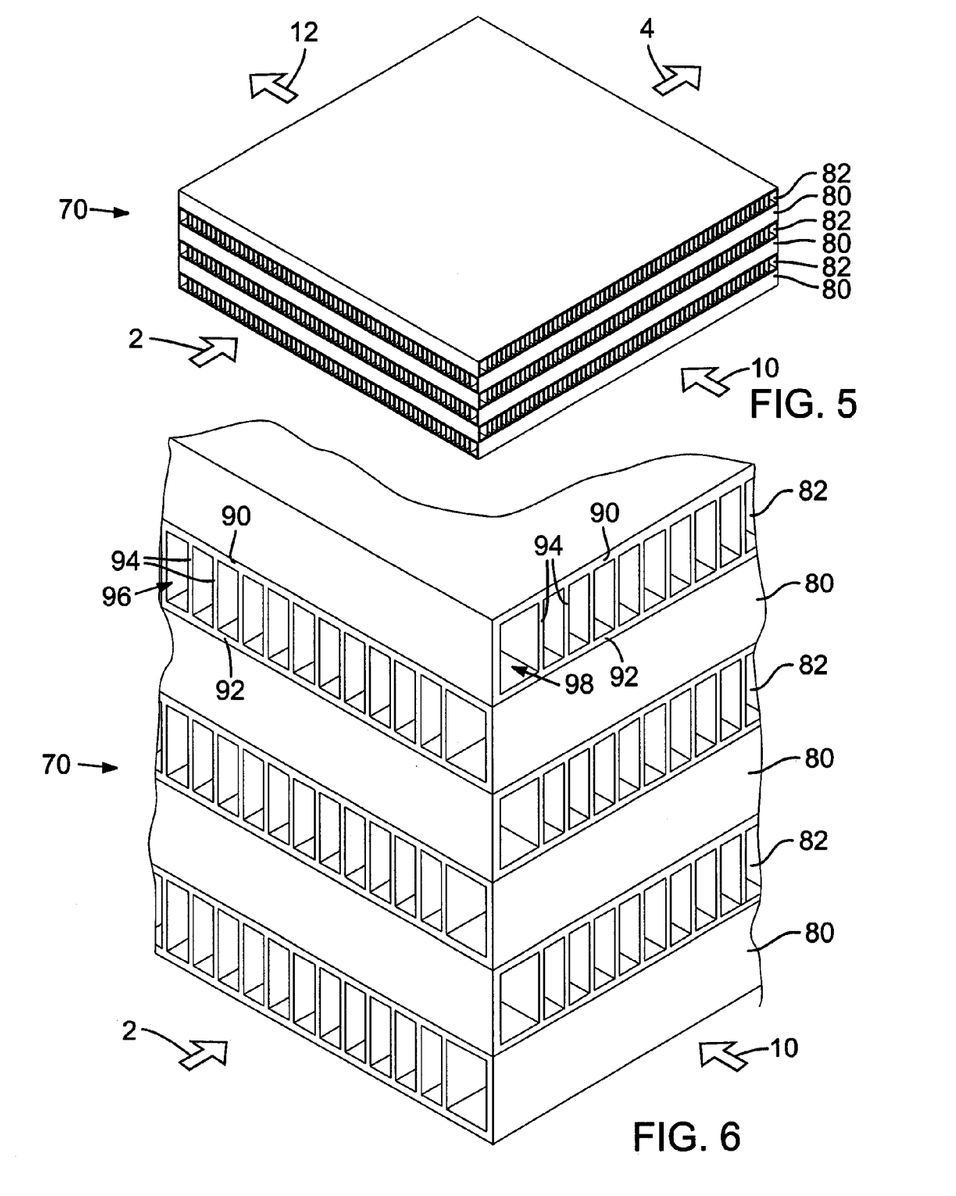
FIG. 5 is an isometric view of a portion of a core of the heat exchanger of FIG. 2, showing a stack of alternating layers.
FIG. 6 is an enlarged view of FIG. 5, showing a plurality of airflow channels in each of the layers.

The core 70 can comprise a plurality of thin, stacked layers. An exemplary stack of layers 80, 82 is shown in FIG. 5. Every other layer, such as layers 80, can be for conducting a first airflow, such as the incoming ambient airflow, while the interleaved layers, such as layers 82, can be for conducting a second airflow, such as the post-drum airflow. In the embodiment shown in FIG. 5, each layer 80 has a flow direction that is transverse to flow directions of immediately adjacent layers 82. The total number of layers, and thus the height of the stack, can be any practical number. Similarly, the height, length and width of each layer can vary according to the implementation. In general, a greater number of thinner layers results in increased heat transfer between the adjacent layers. Similarly, increased length and width of each layer generally results in increased heat transfer between the layers.

FIG. 5 shows an embodiment wherein each layer 80, 82 of the core 70 is substantially square. In other embodiments, the layers can be other than square. Square layers enable a simpler, cheaper construction of the heat exchanger 40 because each layer can be made identical, or nearly identical, and then a plurality of these layers can simply be stacked with every other layer rotated 90° to form the core 70. In one example, a single elongated piece of extruded aluminum material can be cut into a plurality of substantially equal square units that form the layers 80, 82.

Each layer of the core 70 can comprise a plurality of airflow channels 96 extending lengthwise through the layer form one end of the layer to an opposite end of the layer. In some embodiments, one or more of the airflow channels can be substantially rectangular in cross-section (perpendicular to the airflow direction). In the embodiments shown in FIGS. 5-7, all of the airflow channels 96 are substantially rectangular in cross-section. As shown in FIG. 6, each layer 80, 82 can comprise an upper wall 90 and a lower wall 92 separating each layer from the adjacent layers, and a plurality of evenly spaced dividers 94 extending from the upper wall 90 to the lower wall 92 that define a plurality of flow channels 96 within each layer. In other embodiments, each layer can comprise differently shaped airflow channels and wall structures. In some embodiments, the plurality of airflow channels 96 can have varying widths. For example, in FIG. 6, the endmost airflow channels 98 are wider that the others.

Discrete dividers 94, corrugated dividers, fins, or any equivalent structure that connects to the top wall 90 and/or to the bottom wall 92 can increase the surface area of each layer that is in contact with the airflow and can thereby increase heat conduction between adjacent layers. Adjacent top and bottom walls of adjacent layers can be connected together in a manner that further facilitates heat conduction between the layers, such as with an interlayer adhesive, such as a heat transfer paste or thermal epoxy, soldering or a gasket having a high thermal conductivity and providing a flush contact surface between the adjacent walls.

Figure 7:
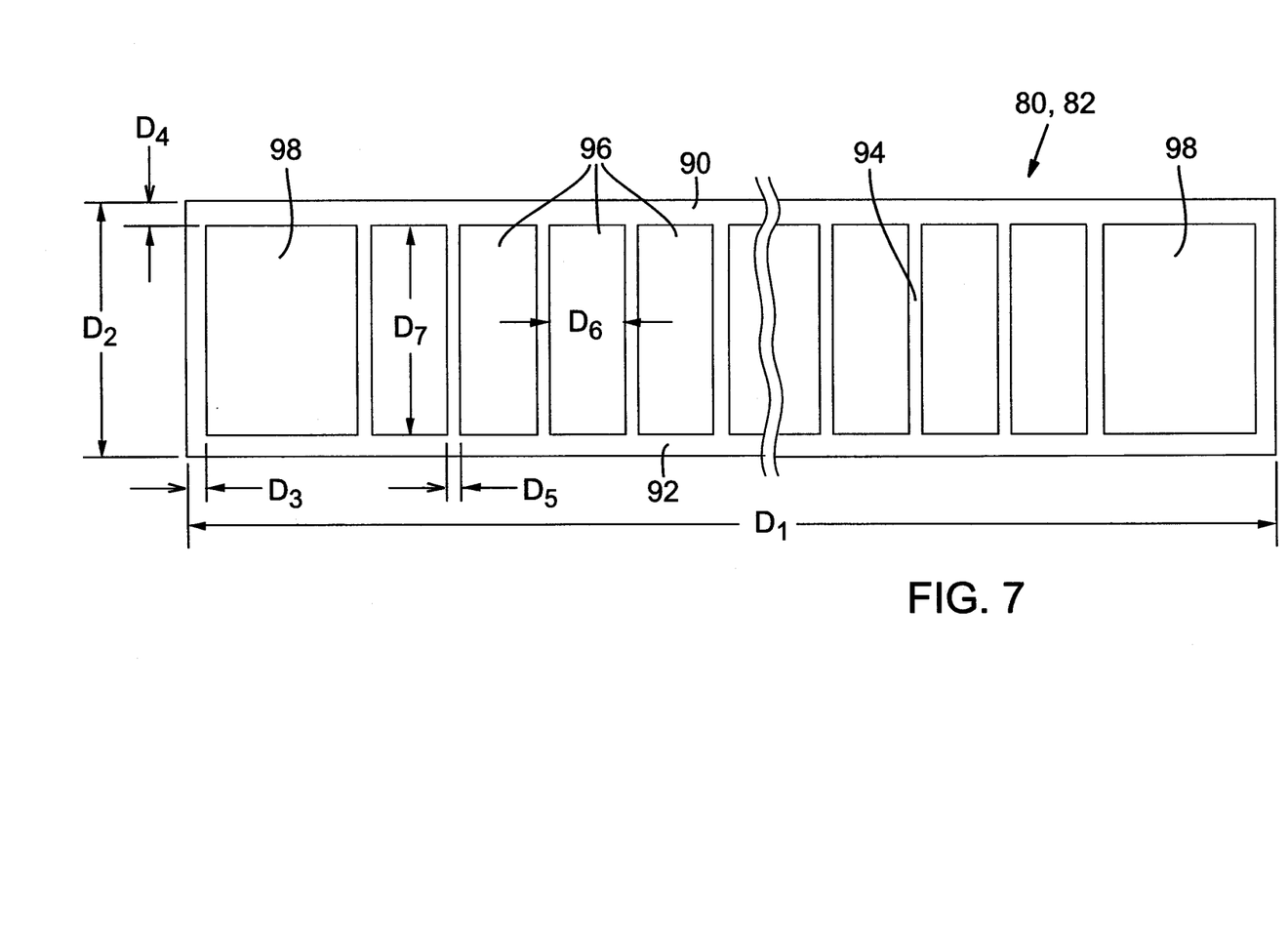
FIG. 7 is an end view of one of the layers of FIG. 5.

With reference to FIG. 7, each layer 80, 82 can have an overall width $D_1$, an overall thickness, or height, $D_2$, an end wall thickness $D_3$, an upper and lower wall thickness $D_4$, a divider thickness $D_5$, and an airflow channel width $D_6$. The overall width $D_1$ of each layer of the core 70 can be about 83.7 mm. At least one of the plurality of layers 80, 82 can have an overall thickness $D_2$ less than or equal to about 3.937 mm. At least one of the plurality of layers can have at least one end wall having a thickness $D_3$ less than or equal to about 0.4 mm. At least one of the plurality of layers can have an upper wall 90 and lower wall 92 each having a thickness $D_4$ less than or equal to about 0.4 mm. At least one of the plurality of layers can have at least one divider 94 having a thickness $D_5$ less than or equal to about 0.3 mm. At least one of the plurality airflow channels 96 can have a width $D_6$ less than or equal to about 1.0 mm and a height $D_7$ less than or equal to about 3.2 mm.

In some embodiments, overall height of the core 70 can be about 70 cm, the core can comprise corner seals that reduced the active width of each layer 80, 82 to about 5 cm, and the core can comprise a flow path of about 7 cm and a flow area of about 107 cm$^2$, which can result in minimal added pressure drop across the stack. In some embodiments, each layer 80, 82 can comprise 60 airflow channels 96 across the width of the layer. In some embodiments, the core 70 can comprise 160-200 layers, or more. An aspect ratio between the total core height and the length of the flow path through each layer can preferably be greater than 5, and more preferably greater than 10. A higher aspect ratio can provide less pressure drop for an equivalent heat transfer area. The heat exchanger 40 can further comprise exterior insulation to reduce heat loss from the drying system.

With regard to commercial clothes dryers, the low-cost, air-to-air heat exchanger 40 is a key to maximizing energy savings at an affordable cost. Constructing the heat exchanger 40 from square layers of extruded aluminum advances this goal. The heat exchanger 40 can recover 15%-30% of the energy required by a dryer from the post-drum air, without consuming power other than what is needed to overcome the slight pressure drop across the heat exchanger 40. This heat recovery percentage can be increased by a dryer from the post-drum air by constructing the heat exchanger with a more complex and expensive counter-flow design. The combination of the passive heat exchanger 40 and the heat pump 30 can recover more than ½, such as about ⅔, of the energy required by the dryer from the post-drum air.

Heat Pump

With reference to FIG. 1, the heat pump 30 comprises the condenser 42, the evaporator 54, a compressor 62, a thermal expansion valve (TEV) or throttle 64, a conduit pathway represented by arrows 20, 22, 24 and 26 fluidly coupling these four components in a closed loop, and refrigerant that flows through the heat pump.

In operation, the compressor 62 consumes power to increase the pressure of the refrigerant at point 20 relative to point 26 and thereby pump the refrigerant around the heat pump loop in the direction of arrows 20, 22, 24 and 26. Refrigerant exits the compressor 62 at point 20 as high pressure vapor and passes to condenser 42 where heat of condensation (of the refrigerant) is transferred away to the drying air passing through the condenser from point 4 to point 6. The refrigerant condenses within the condenser 42 and exits the condenser at point 22 as high pressure liquid. The high pressure liquid at point 22 then passes through the TEV 64, which reduces the refrigerant pressure. The refrigerant exits the TEV 64 at point 24 as a low pressure, low quality liquid and/or liquid/vapor mixture (high liquid content), and enters the evaporator 54.

The evaporator 54 extracts heat of vaporization of the refrigerant from the post-drum air flowing through the evaporator from point 12 toward point 14, which boils the refrigerant to the vapor state. Slightly superheated vapor exits the evaporator 54 at point 26 and reenters the compressor 62, completing the heat pump cycle.

The heating capacity of the condenser 42 can be equal to the cooling capacity of the evaporator 54 plus the power consumption of the compressor 62. Because the heat pump 30 is an active, power-consuming heat transfer system, the air temperature at point 14 can be lower than the air temperature at point 4, and can even be lower than the ambient air temperature at point 2. In addition, the air temperature at point 6 can be greater than the air temperature at point 12.

The coefficient of performance (COP) of the heat pump 30 can be directly related to the amount of heat added by the heating element, while the duty of the heat pump can be inversely related to the amount of heat added by the heating element. Thus, the size and energy consumption of the heat pump 30 can be reduced by increasing the heat output of the heating element, and conversely, the size and power consumption of the heating element can be reduced by increasing the capacity and power consumption of the heat pump. The size and energy consumption of the heat pump 30 can also be reduced due to the presence of the passive heat exchanger, which can passively recycle some of the post-drum heat without consuming any power. The heat pump 30 can be sized to achieve 50% total energy savings compared to a conventional clothes dryer by recovering an additional ⅓ of the heat input. In one embodiment, the COP of the heat pump 30 can be about 3.3, which is about ½ of an estimated Carnot COP. In another embodiment, the COP of the heat pump 30 can be about 5.6. The estimated duty of the heat pump 30 can be about 0.8 kW (2700 Btu/hr), which is equivalent to a small room air conditioner without air movers.

The evaporator 54 and condenser 42 can achieve very high air-side heat transfer coefficients with extremely low pressure drops. This can result in no significant difference in the size and power consumption demand of the blower 60 compared to blowers used in conventional clothes dryers. To achieve low pressure drop across the evaporator 54 and condenser 42, these structures can comprise cross-flow panels that are very thin and have a very large airflow area. In one embodiment, microchannel panels can be approximately ½ inch thick.

The drum 50, the blower 60, the passive heat exchanger 40, the heat pump 30 and the heating element 44 can be contained within a structure having a height, width and depth that are equal to or less than a height, width and depth of a conventional residential clothes dryer structure.

Lint Management

As with conventional clothes dryers, a conventional lint trap can be positioned at the air outlet of the drum 50. However, some lint may pass through this primary lint trap. The passive heat exchanger 40 is the first component exposed to lint after the primary lint filter. The passive heat exchanger 40 can have a relatively large face area, such as at the duct 76 (see FIG. 2), that can accommodate a secondary lint trap without a significant pressure drop penalty. The secondary lint trap can comprise a finer mesh than the primary lint trap. The secondary lint trap can further protect the passive heat exchanger 40, the evaporator 54, and the blower 60 from lint migration.

The drying system can further comprise a bypass airflow pathway for conducting air from the drum 50 to the exhaust outlet 16 without passing through the passive heat exchanger 40 and/or the evaporator 54. The bypass can comprise a simple spring actuated dampener and can be triggered to conduct airflow through the bypass airflow pathway when the pressure drop across the heat exchanger 40 and/or the evaporator 54 exceeds a specified limit as a result of lint build-up. A sensor/indicator system can monitor and notify when the secondary lint trap needs cleaning. Like a conventional lint trap, the secondary lint trap can be easily removable for cleaning.

The core 70 of the passive heat exchanger 40 can also be removed for cleaning. Because the heat exchanger 40 is does not have refrigerant connections, like the heat pump components, the core 70 of the heat exchanger can be easily removed. In one embodiment, the dryer enclosure comprises an access door, a mechanism for releasing the core 70, and means for sliding the core in and out for cleaning. This is akin to a removable car air filter.

Additional Features

A drying system as described herein can also comprise addition functional features. These features can include an intelligent computerized control system, temperature and moisture sensors located through the system to provide feedback to the control system, and user interfaces for inputting desired operating parameters.

Advantages

The open-loop heat-recovery drying system can provide desirable advantages compared to convention drying system that uses only a heating element to heat incoming air and exhausts the post-drum air without recovering any heat. The total energy consumption of the open-loop heat-recovery drying system can be the sum of the blower 60 motor, the heating element 44, and the compressor 62. The power consumption of blower 60 and the airflow rate through the system can be similar to conventional clothes dryer.

Due to the addition of the passive heat exchanger 40 and the heat pump 30, the heating element 44 can consume as little as ⅓ of the power of a conventional dryer heating element. The combined power consumption of the heat pump 30 and the heating element 44 can be less than ½ of the power consumption of a heating element of a conventional residential clothes dryer. Due to the passive heat recovery of the heat exchanger 40, the heat pump 30 can have about ⅓ of the duty and have a lower temperature lift than if the passive heat exchanger 40 was not present in the system, resulting in the heat pump being smaller, more efficient, and more affordable.

Greater energy savings along with shorter cycle times are possible with higher temperature settings, such as for towels or other durable fabrics, and/or with increased airflow rates through the system. At similar airflow rates and drum temperatures, drying times can be comparable to conventional clothes dryers, as the total heat entering the drum 50 can be about the same. The open-loop heat-recovery drying system can also result in significantly shorter drying times. A high-temperature setting can be included to increase power to the heating element 44 and thereby increase operating temperature within the drum 50 and shorten drying time. The airflow rate can also be increased, such as by about 10-20% or up to about 120 cfm, which can reduce the operating temperature within the drum 50 as well as shorten drying time.

The heat pump 30 can be considerably down-sized due to the presence of the passive heat exchanger 40, resulting in about a ⅓ to ½ of the duty and with a smaller temperature lift. The passive heat exchanger 40 and heating element 44 together can provide ⅔ of the heat input to the drum 50. Due to the sequence of heat inputs, the condenser 42 can run cooler and the evaporator 54 can run warmer. Derating the heat pump 30 to the equivalent of a small room air conditioner can result in a significant reduction in size and cost.

The emergence of Grid-friendly Appliances technology presents an opportunity to gain additional energy savings and advantages. In a residential clothes dryer embodiment, the dryer control system can be configured to communicate with appropriate environmental sensors to determine whether the exhaust air should be directed inside or outside of the living space, depending on current conditions. This can allow the dryer to cooperate with the HVAC system to further reduce energy consumption.

Simulations

Simulations were performed using variations of the embodiment of the drying system shown in FIG. 1. In a first simulation, the heat pump 30 and passive heat exchanger 40 were not included (i.e., a conventional open-loop drying system). In a second simulation, the passive heat exchanger 40 was included but the heat pump 30 was not included. In a third simulation, the system included both the heat pump 30 and the passive heat exchanger 40, as is shown in FIG. 1.

The air flow into the system at point 2 was a constant 100 CFM (cubic foot per minute) of dry air at 20 C, and the amount of liquid water added to the air was kept constant at 1 g/s. The simulations also attempted to keep the temperature of the air entering the drum 50 constant for comparison, which required a total of 3 kW of heat input into the air from point 2 to point 8, which also produced a consistent temperature and dew point out of the drum, which was 32 C and 22.4 C, respectively. This represents a static point representative of the middle part of a drying cycle when the drum is at temperature and the clothes are relatively wet, which is the majority of the drying cycle.

The baseline case, with the heat exchangers 30 and 40 turned off, therefore requires 3 kW of electric power to the heater 44 plus some amount of power to the blower 60. There will be some additional power required for the blower 60 to maintain the same air flow with the addition of the passive heat exchanger 40, condenser 42 and evaporator 54 in the flow path. The added power is a function of the pressure drop.

In another simulation, the passive heat exchanger 40 is added that transfers 500 W of heat from stream 10 to stream 2, which represents a heat transfer effectiveness of 72%, which is achievable with a cross-flow heat exchanger of the type shown in FIGS. 2-4. As a consequence, the heating element 44 is downgraded from 3000 W to 2500 W, and there is a savings of ⅙ or 16.7% of the heat.

In another simulation, the passive heat exchanger 40 is again maintained at 500 W of duty, which maintains its performance at 72% effectiveness because streams 10 and 2 are the same as above. The condenser 42 of the heat pump supplies an additional 1215 Watts of heat to air stream 4 to heat it from 28.7 C to 50.0 C at stream 6. The electric heater provides 1280 Watts to stream 6 to reach a temperature of 72.4 C at stream 8. Removing 500 Watts of heat from stream 10 in the passive heat exchanger 40 cools it to 23.6 C. In this example, water does not condense and stream 52 has zero flow. The heat pump evaporator 54 removes 1000 Watts of heat from stream 12 to attain a temperature of 16 C in stream 14. The evaporator condenses 24% of the water in stream 12.

The heat pump is operated with R-134a refrigerant. The compressor 62 pressurizes the refrigerant from 48 psig and 14.2 C in stream 26 to a pressure and temperature of 175 psig and 70.2 C, respectively, in stream 20. Assuming a compressor efficiency of 75%, this requires 216 Watts of power to the compressor. The condenser 42 is assumed to take a 3 psi pressure drop and slightly sub-cools the condensed refrigerant to 46.4 C. The throttling valve 64 is assumed to be adiabatic and produces stream 24 at 12.3 C, 50 psig, and 25% vapor. The evaporator 54 is assumed to have 2 psig pressure drop.

The coefficient of performance (COP) of the heat pump is 5.6, based on the condenser duty. The compression ratio is 3.6. The cooling duty is only 1 kW in the evaporator, which represents only slightly more than ¼ ton of refrigeration, the size of a small room air conditioner. In this configuration, the temperature lift is only from about 12 C to 50 C. To achieve the same result without the electric heater providing the high temperature heat, the lift would have to be from 12 C to 70 C. The condenser duty would double from 1200 Watts to 2500 Watts, the pressure ratio and condenser pressure would increase, and the heat pump COP would decrease.

In summary, the overall breakdown of heat exchanger heat duties in this example are 500 Watts in the passive heat exchanger 40, 1215 Watts in the condenser 42, 1000 Watts in the evaporator 54. Power consumption is 1280 Watts to the electric heater 44 and 215 Watts to the compressor 62, for a total of 1495 Watts or 50% of the electric heater only simulation above. It should be noted that flow and temperature of the air to the dryer drum 50 are equivalent in both cases.

Other Improvements

Energy savings can be improved when the temperature of the stream 8 to the drum 50 is allowed to increase, which can increase the temperature and water content of the stream 10 exiting the drum. The higher energy content of stream 10 can increase the amount of heat transferred in the passive heat exchanger 40. In addition, the higher energy content of stream 10 can shorten the drying cycle, which is of value to consumers. This has been demonstrated when a passive heat exchanger was added to a commercially available dryer without reducing the power to the heating element. Higher drum temperatures are harder on clothes, but adding a 'high temperature' option for drying towels, for example, is a marketable feature.

Drying time is recognized as important to consumers and the ability to shorten drying time to be commensurate with washer cycle times can demand a price premium. As drying times of current residential clothes dryers are limited by the power available from a standard 240 V circuit, a reduction in power draw by 50% creates the opportunity to increase air flow rate incrementally to shorten drying time. For example, increasing air flow by 20% can increase the power draw to 1800 Watts in the example case, which can decrease drying time by 20%.

In view of the many possible embodiments to which the principles of the disclosed invention may be applied, it should be recognized that the illustrated embodiments are only preferred examples and should not be taken as limiting the scope of the disclosure. Rather, the scope of the disclosure is defined by the following claims. We therefore claim all that comes within the scope and spirit of these claims.

We claim:

1. A drying apparatus, comprising:
   a drying chamber for containing articles to be dried;
   an open-loop airflow pathway originating at an ambient air inlet, passing through the drying chamber, and terminating at an exhaust outlet;
   an air pump for inducing air to flow through the airflow pathway in a direction from the ambient air inlet toward the exhaust outlet;
   a passive heat exchanger for passively transferring heat from air flowing from the drying chamber toward the exhaust outlet to air flowing from the ambient air inlet toward the drying chamber;
   a heat pump for actively transferring heat from air flowing from the passive heat exchanger toward the exhaust outlet to air flowing from the passive heat exchanger toward the drying chamber; and
   a heating element for heating air flowing from the heat pump toward the drying chamber.

2. The drying apparatus of claim 1, wherein the heat pump comprises a condenser and an evaporator, the condenser being in the airflow pathway between the passive heat exchanger and the heating element, and the evaporator being in the airflow pathway between the passive heat exchanger and the exhaust outlet.

3. The drying apparatus of claim 1, wherein the passive heat exchanger comprises a core comprising a stack of layers, the core having a total stack height and a flow path length through the layers, an aspect ratio between the total stack height and the flow path length being greater than or equal to 5.

4. The drying apparatus of claim 1, wherein air flowing through the passive heat exchanger from the drying chamber flows in a first direction and air flowing through the passive heat exchanger toward the drying chamber flows in a second direction transverse to the first direction.

5. The drying apparatus of claim 1, wherein the passive heat exchanger comprises a plurality of layers, each layer having a flow direction that is transverse to flow directions of immediately adjacent layers.

6. The drying apparatus of claim 5, wherein each layer comprises a plurality of substantially rectangular airflow channels extending therethrough.

7. The drying apparatus of claim 6, wherein at least one of the plurality channels has a width less than or equal to about 1.0 mm and a height less than or equal to about 3.2 mm.

8. The drying apparatus of claim 5, wherein at least one of the plurality of layers has an overall thickness less than or equal to about 4.0 mm.

9. The drying apparatus of claim 1, wherein, during normal operation, air exiting the exhaust outlet is cooler than air entering the ambient air inlet.

10. The drying apparatus of claim 1, further comprising a first lint filter at an airflow outlet of the drying chamber and a second lint filter at an airflow inlet of the passive heat exchanger.

11. The drying apparatus of claim 1, further comprising a bypass airflow pathway for conducting air from the drying chamber to the exhaust outlet without passing through the passive heat exchanger or the heat pump.

12. The drying apparatus of claim 1, wherein a core of the passive heat exchanger is removable from the remainder of the passive heat exchanger for cleaning.

13. The drying apparatus of claim 1, wherein the powered heating element substantially heats air entering the drying chamber throughout a drying cycle.

14. The drying apparatus of claim 1, wherein a combined power consumption of the heat pump and the heating element is less than ½ of a power consumption of a conventional residential clothes dryer heating element.

15. The drying apparatus of claim 1, wherein air exiting the exhaust outlet is used to condition an enclosed environment.

* * * * *